(12) United States Patent
Janssen

(10) Patent No.: US 10,311,309 B2
(45) Date of Patent: *Jun. 4, 2019

(54) METHOD AND DEVICE FOR INTERPRETING A SURROUNDING ENVIRONMENT OF A VEHICLE, AND VEHICLE

(71) Applicant: Robert Bosch GmbH, Stuttgart (DE)

(72) Inventor: Holger Janssen, Hessisch Oldendorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 226 days.

This patent is subject to a terminal disclaimer.

(21) Appl. No.: 15/436,018

(22) Filed: Feb. 17, 2017

(65) Prior Publication Data

US 2017/0243070 A1 Aug. 24, 2017

(30) Foreign Application Priority Data

Feb. 19, 2016 (DE) .................. 10 2016 202 594

(51) Int. Cl.
*G06K 9/00* (2006.01)
*G06T 7/70* (2017.01)
*B60R 1/00* (2006.01)
*B60W 50/00* (2006.01)

(52) U.S. Cl.
CPC ............ *G06K 9/00791* (2013.01); *B60R 1/00* (2013.01); *B60W 50/00* (2013.01); *G06K 9/00664* (2013.01); *G06T 7/70* (2017.01); *B60R 2300/307* (2013.01); *G06T 2207/30252* (2013.01)

(58) Field of Classification Search
None
See application file for complete search history.

(56) References Cited

U.S. PATENT DOCUMENTS

2015/0353083 A1* 12/2015 Hasberg ............. G06K 9/00805
701/1

* cited by examiner

*Primary Examiner* — Atiba O Fitzpatrick
(74) *Attorney, Agent, or Firm* — Norton Rose Fulbright US LLP; Gerard Messina

(57) ABSTRACT

A method is described for interpreting a surrounding environment of a vehicle. The method includes a step of providing an image of the surrounding environment of the vehicle, a step of forming an item of relational information using a first position of a first object in the image and a second position of a second object in the image, the item of relational information representing a spatial relation between the first object and the second object in the surrounding environment of the vehicle, and a step of use of the item of relational information in order to interpret the surrounding environment of the vehicle.

12 Claims, 3 Drawing Sheets

METHOD AND DEVICE FOR INTERPRETING A SURROUNDING ENVIRONMENT OF A VEHICLE, AND VEHICLE

FIELD OF THE INVENTION

The present invention is based on a device or method for interpreting a surrounding environment of a vehicle, and vehicle. The subject matter of the present invention is also a computer program.

BACKGROUND INFORMATION

Systems for driver assistance use, as a rule, sensors having different physical properties in order to acquire the situation in which the home vehicle is situated. The information from the sensors is processed so that driver assistance functions—for example the longitudinal guiding of the vehicle, also called ACC (Adaptive Cruise Control)—can be realized.

SUMMARY

Against this background, the approach presented here presents a method for interpreting a surrounding environment of the vehicle, as well as a device that uses this method, a vehicle, and, finally, a corresponding computer program.

A use of positions of objects in an image of a surrounding environment of a vehicle in order to form an item of relational information that represents a spatial relation between the objects in the surrounding environment of the vehicle makes it possible to introduce relative object descriptions for the realization of driver assistance functions and/or automated driving functions and/or automatic driving functions.

The image can be an image of a scene close to the sensor. The image can be regarded as a description of the driving situation surrounding the vehicle. The image can be for example a central-perspective image, or can be an image depicting the scene from a bird's-eye view. The image can be a representation of the scene from the point of view of a video sensor.

In particular, the image can be an image from a video sensor of the vehicle that, according to a specific embodiment of the design proposed here, analyzes, from the image, the relative object descriptions and relations, combines them in an internal interpretation, and provides the result of the interpretation and/or the objects and/or the relations between the objects to an external interface to a driver assistance system and/or driving functions of the vehicle.

A method is presented for interpreting a surrounding environment of a vehicle, the method having the following steps:
provision of an image of the surrounding environment of the vehicle;
formation of an item of relational information, using a first position of a first object in the image and a second position of a second object in the image, the item of relational information representing a spatial relation between the first object and the second object in the surrounding environment of the vehicle; and
use of the item of relational information to interpret the surrounding environment of the vehicle.

This method can be implemented for example in software or hardware, or in a mixed form of software and hardware, for example in a control device.

The surrounding environment of the vehicle can be an environment of the vehicle relevant for driver assistance functions of the vehicle. The surrounding environment of the vehicle can include infrastructure and/or animate or inanimate objects at relatively close vicinity to the vehicle. The surrounding environment of the vehicle can vary as a function of whether the vehicle is moving in a rural or urban environment, and also as a function of the type of street currently being traveled by the vehicle. The optical sensor can be part of a video camera assigned to a driver assistance system of the vehicle, situated behind the windshield of the vehicle. The image can be an image close to the sensor of a scene in the surrounding environment of the vehicle. The image can for example be an image having central perspective. The image can also represent a bird's-eye view. The image can be an image produced by an optical sensor oriented in a direction of travel of the vehicle. The image can correspondingly be a digital video image. Corresponding to the position of the camera, the image can depict a segment of the surrounding environment of the vehicle situated in front of the vehicle in the direction of travel, in particular a street segment situated in front of the vehicle in the direction of travel, and infrastructure regions bordering the vehicle laterally, and objects situated in the segment.

The objects can be for example traffic participants, such as vehicles, pedestrians, or bicyclists, a travelable surface of the depicted scene—a so-called open surface—roadway markings, traffic infrastructure, lateral boundary structures such as guide rails and posts, green strips, etc., vegetation, buildings, the sky, etc. In the respective context, an object can be understood as a real object of the real surrounding environment of the vehicle or a virtual object, representing a real object, in the digital image of the surrounding environment of the vehicle. A position of an object can correspond to a position of the pixel imaging the object in the digital image. The spatial relation between the first object and the second object can be for example a distance between the objects, a distance of at least one object from the vehicle, a direction of movement and/or speed of movement of at least one of the objects, or a partial occlusion of one of the objects by the other. The item of relational information can be ascertained using a number and size of pixels of the image that represent a relation between the first and the second object in the image, for example a distance of the objects.

For an advantageous tracking of at least one object in the surrounding environment of the vehicle, the steps of the method can be executed repeatedly.

The design presented herein describes, in a preferred specific embodiment, an interface of a video sensor that is adapted as optimally as possible to the properties of the sensor and that directly uses the physical properties of a video sensor. In this way, performance-reducing transformations of the sensor information—for example from a frontal view of a situation into a grid representation (network representation) or bird's-eye view—are avoided, or are supplemented with further direct video information. The information derived directly from the physical properties of the sensor can supplement the interfaces, for example in the bird's-eye perspective projection. This procedure increases the scope of the information from the video sensor that can be used. This is so extensive that in the future it will be possible to greatly reduce the number of additional sensors for realizing driver assistance functions. This will yield large market advantages for sensors that exploit the potential of the respective sensors as completely as possible. Through the design presented here, the range and/or availability of the acquired objects within the driving situation can also be increased.

According to a specific embodiment, in the step of use, the relational information can be used for a lateral steering function, for example a lane holding function, and/or for a longitudinal regulation of the vehicle. Longitudinal regulation here also includes for example following a vehicle. In this way, the lane holding function can be realized in a particularly robust fashion.

It is also advantageous if the method has a step of assignment of the first object and/or the second object to an object class. Correspondingly, in the step of use in addition the object class can be used to interpret the surrounding environment of the vehicle. According to this specific embodiment of the method, the surrounding environment of the vehicle can advantageously be interpreted with low computing outlay.

According to a further specific embodiment, the method can have a step of forming an item of occlusion information. The occlusion information can represent an occlusion of the first object by the second object in the image. Correspondingly, in the step of use the occlusion information can in addition be used to interpret the surrounding environment of the vehicle. The occlusion information can easily contribute to determining a spatial relation of the first object relative to the vehicle.

For example, in the step of forming a relation, in addition a further item of relational information can be formed using a further first position of a further first object in the image and a further second position of a further second object in the image. Here, the further item of relational information can represent a spatial relation between the further first object and the further second object in the surrounding environment of the vehicle. Correspondingly, in the step of use, in addition the further item of relational information can be used to interpret the surrounding environment of the vehicle. The further item of relational information can easily be used to verify the item of relational information.

According to a particular specific embodiment, the step of use can have a step of generating a relation value between the item of relational information and the further item of relational information. In this way, the surrounding environment of the vehicle can be interpreted using the relation value.

This specific embodiment of the method enables an advantageous propagation of the interpretation of the surrounding environment of a vehicle to remote locations.

For example, in the step of use of the relation value can be used for following travel behind another vehicle.

It is also advantageous if the method has a step of determining a bearing of one of the objects or of another object relative to the optical sensor. Correspondingly, in the step of use the bearing can additionally be used to interpret the surrounding environment of the vehicle. Thus, the polar acquisition design of the optical sensor in its direct use can be used advantageously for the interpretation of the surrounding environment of the vehicle.

The approach presented here also provides a device that is fashioned to carry out, control, or realize the steps of a variant of the method presented here in corresponding devices. Through this variant embodiment of the present invention in the form of a device as well, the underlying object of the present invention can be realized quickly and efficiently.

For this purpose, the device can have at least one computing unit for processing signals or data, at least one storage unit for storing signals or data, at least one interface to a sensor or to an actuator for reading in sensor signals from the sensor or for outputting data or control signals to the actuator, and/or at least one communication interface for reading in or outputting data that are embedded in a communication protocol. The computing unit can for example be a signal processor, a microcontroller, an ASSP, an SOC, or the like, and the storage unit can be a flash memory, an EPROM, or a magnetic storage unit. Data can also be stored in a cloud, decentrally from the vehicle. The communication interface can be fashioned to read in or to output data wirelessly and/or in wire-bound fashion, and a communication interface that can read in or output the wire-bound data can read in these data for example electrically or optically from a corresponding data transmission line, or can output them to a corresponding data transmission line.

In the present context, a device can be understood as an electrical apparatus that processes sensor signals and outputs control and/or data signals as a function thereof. The device can have an interface that can be fashioned as hardware and/or as software. In the case of a realization as hardware, the interfaces can for example be part of a so-called system ASIC and/or system ASSP, containing a wide variety of functions of the device. However, it is also possible for the interfaces to be separate integrated circuits, or to be made up at least partly of discrete components. In the case of a realization as software, the interfaces can be software modules present for example on a microcontroller alongside other software modules.

In an advantageous embodiment, through the device there takes place a forming of relational information using positions of objects in a digital image of a surrounding environment of a vehicle. For this purpose, the device can have access to video signals of a video sensor installed in the vehicle.

In addition, a vehicle is presented having an optical sensor, a driver assistance system, and a device as described above. The device is connected in electrically conductive fashion to the optical sensor and/or to the driver assistance system.

The driver assistance system can provide a lane holding assistant or functions such as autonomous driving or automatic braking of the vehicle.

Also advantageous is a computer program product or computer program having program code that can be stored on a machine-readable bearer or storage medium such as a semiconductor memory, a hard drive memory, or an optical memory, and that is used to carry out, realize, and/or control the steps of the method according to one of the specific embodiments described above, in particular when the program product or program is executed on a computer or on a device.

DETAILED DESCRIPTION

Figure 1:
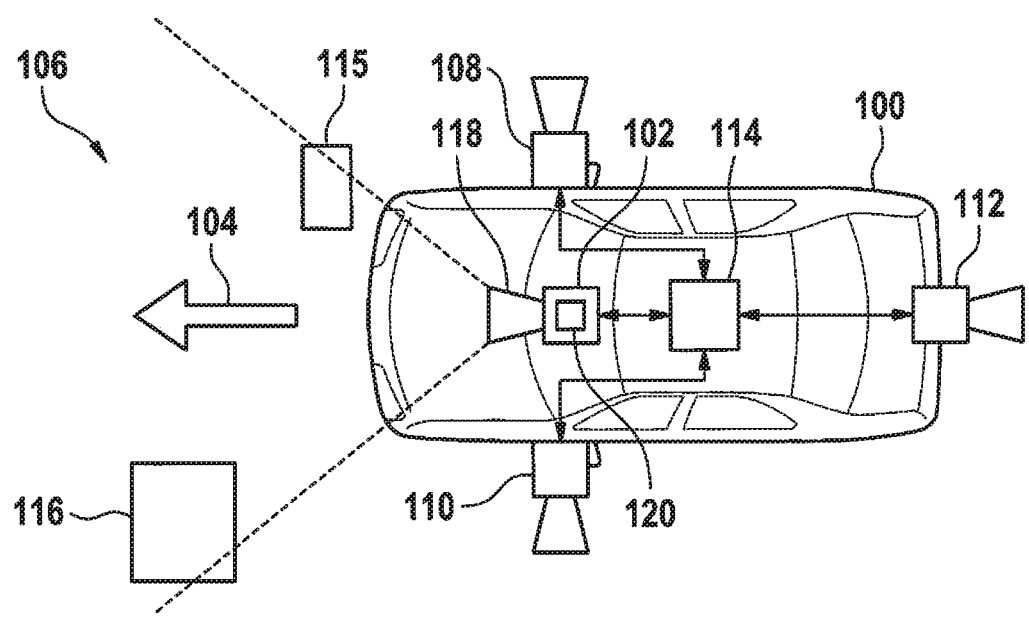
FIG. 1 shows a vehicle having a driver assistance system according to an exemplary embodiment.

In the following description of advantageous exemplary embodiments of the present invention, identical or similar reference characters are used for elements shown in the various Figures and having similar function, and repeated description of these elements is omitted.

FIG. 1 shows a vehicle 100 in a top view. In the exemplary embodiment shown in FIG. 1, vehicle 100 is a passenger vehicle. Vehicle 100 can also be some other road vehicle, such as a truck or motorcycle.

Vehicle 100 shown as an example has a plurality of video cameras installed at various positions in vehicle 100. A first video camera 102 is installed behind a windshield of vehicle 100, and is oriented toward a segment of a surrounding environment 106 of vehicle 100 situated in front of vehicle 100, in a direction of travel 104 of vehicle 100. A second video camera 108 is installed in a right exterior mirror of vehicle 100 and is oriented toward a segment of surrounding environment 106 of vehicle 100 situated laterally to the right of vehicle 100 in direction of travel 104. A third video camera 110 is installed in a left external mirror of vehicle 100 and is oriented towards a segment of surrounding environment 106 of vehicle 100 situated laterally to the left of vehicle 100 in direction of travel 104. A fourth video camera 112 is installed in a rear region of vehicle 100 and is oriented toward a segment of surrounding environment 106 of vehicle 100 situated behind vehicle 100 in direction of travel 104.

In addition, vehicle 100 has a driver assistance system 114 that is connected in electrically conductive fashion to video cameras 102, 108, 110, 112, for example via a CAN bus of vehicle 100. Optical sensors or video sensors of video cameras 102, 108, 110, 112 produce video signals of vehicle surrounding environment 106 visible to the sensors, which signals are processed in the assigned image processing devices of video cameras 102, 108, 110, 112 to form digital images of the acquired surrounding environment 106 of the vehicle.

Via functions that are connected downstream and/or contained in video cameras 102, 108, 110, 112, this image information is provided to driver assistance system 114 via suitable interfaces in order to realize driver assistance functions.

According to the representation shown in FIG. 1, video cameras 102, 108, 110, 112 acquire a situation in which vehicle 100 is located through the surface of their respective image sensors, and recognize in this situation objects that are relevant for the driver assistance function, or further items of information. As an example, in FIG. 1 a first object 115 and a second object 116 are shown in vehicle surrounding environment 106, which in the exemplary driving situation shown in FIG. 1 are situated in the area of acquisition of first video camera 102.

For example, an optical sensor 118 of first video camera 102 acquires, in the driving situation of vehicle 100, a street segment situated in front of vehicle 100 in direction of travel 104, as well as the two objects 115, 116, and provides a corresponding image signal. Using the image signal, the image processing device of first video camera 102 produces a digital image, having central perspective, of the acquired environment 106, in which infrastructure elements as well as objects 115, 116 of the acquired segment of vehicle surrounding environment 106 are shown on a surface. The central-perspective representation is here selected only as an example. A representation from a bird's-eye perspective is for example also possible.

According to the design proposed here, vehicle 100 is equipped with at least one device 120 for interpreting a surrounding environment 106 of vehicle 100. Device 120 is connected in electrically conductive fashion to first video camera 102, and is fashioned to form at least one item of relational information, using positions of virtual images of objects 115, 116 in a central-perspective image produced by video camera 102 of vehicle surrounding environment 106, which item of relational information represents a spatial relation between real objects 115, 116 in vehicle surrounding environment 106, and to use this item of relational information to interpret vehicle surrounding environment 106.

In the exemplary embodiment shown in FIG. 1, device 120 is part of first video camera 102, for example in the form of an interface of video camera 102, which is adapted as optimally as possible to the properties of sensor 118, and that directly uses the physical properties of a video sensor.

According to an exemplary embodiment, the other video cameras 108, 110, 112 installed in vehicle 100 are also equipped with a separate device 120.

In an alternative variant, device 120 is installed in vehicle 100 remote from video camera 102, and is coupled to video camera 102 in electrically conductive fashion for example via the CAN bus. For example, device 120 can also be part of driver assistance system 114 and can be fashioned to process digital images of all available cameras 102, 108, 110, 112 centrally to form items of relational information for the interpretation of vehicle surrounding environment 106. Besides the digital images, descriptions of the surrounding environment of the vehicle can also be transmitted from the respective cameras 102, 108, 110, 112 to central unit 114.

The object of device 120 is to provide relative object descriptions and relations that are based on a constellation of the objects 115, 116 acquired in vehicle surrounding environment 106 in the central-perspective image of the flat image sensor of video camera 102.

A camera system realized according to the design proposed here for driver assistance has a high degree of efficiency with simultaneously low system complexity and low system costs.

According to the presented design, based on the relative descriptions of video sensor 118 driver assistance functions of driver assistance system 114 can realize an improved regulation strategy that increases the quality of the respective function. For example, regulation can take place in more robust fashion when based on a (relative) collision time than when based on absolute coordinates determined indirectly from the video material. From this, advantageous behavior patterns are derived for a video-based driver assistance system 114. For example, for following travel in a lane, the relative distance from a vehicle traveling in front is regulated relative to the distance from the course of the lane. For travel on an open surface, there takes place an orientation based on relative distances to lateral boundaries such as guide rails.

In order to support scene interpretation, information from a digital map stored in vehicle 100 can also advantageously be used. If, on a current roadway segment, the shape of the street does not change, as is typical for travel on a highway without entrances and exits, then the situation can relatively safely be assumed to be uniform and constant. Here, the close range and far range of camera 102 will show large degrees of similarity in the infrastructure of the roadway. The relative descriptions of the scene content can advantageously be used by driver assistance functions that are optimized for this interface format.

According to an exemplary embodiment, in addition to or alternatively to at least some of the video cameras 102, 108, 110, 112, radar sensors can be installed in vehicle 100. These acquire the back-scatter signals of objects 115, 116 and measure the distance from objects 115, 116. Additional sensors such as lidar, ultrasound, etc., are also conceivable in this connection.

The design presented here of the relative object descriptions for use in new video sensor interfaces for driver assistance systems can also be realized in combination with a driver assistance function in which the information from the various sensors in a driver assistance system is fused to optimize the functional behavior. Before the fusion, there takes place a conversion of the information into a uniform, fusionable representation. Very often, here Cartesian absolute representations of the situation in which the vehicle is located are used. This form of representation is referred to as a so-called grid representation (network representation). This uniform modeling of the scene entails that as a rule the sensors can no longer supply their data and information in their native coordinate system, due to the conversion to the fusionable format.

If the information from video sensors 118 is transformed into a grid representation, the frontal direction of observation from which the scene was originally recorded is rotated by almost 90° and the scene is regarded from above. Here, relations between objects 115, 116 originally contained in the image of the scene are lost. Functions based on this "classical" grid representation here for example use video sensor 118 in suboptimal fashion. This can be compensated by adding the relational information based on the perspective representation, according to the approach proposed herein.

With the design proposed here, the sensor setup of vehicle 100 can be advantageously simplified. Thus, a reduction to only one radar sensor and one video sensor can be realized. In addition, it is conceivable that complex driving functions can also be realized on a single main sensor; here, above all video sensor 118 is suitable, because it has the largest bandwidth and can supply the most complete information concerning a driving situation.

Figure 2:
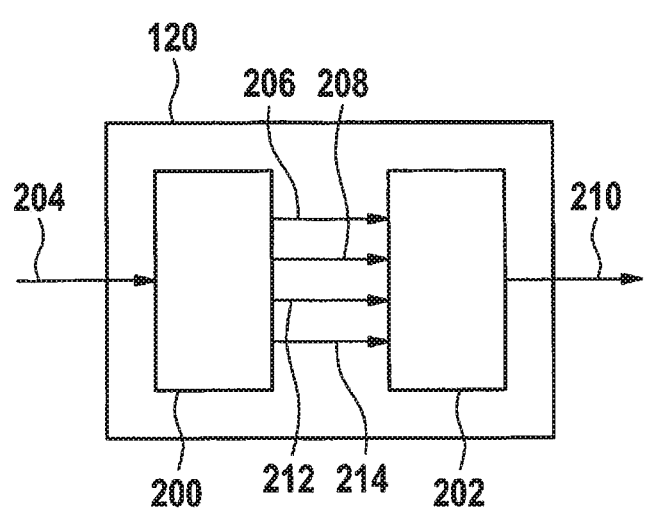
FIG. 2 shows a block diagram of a device for interpreting a surrounding environment of a vehicle, according to an exemplary embodiment.

FIG. 2 shows a block diagram of an exemplary embodiment of device 120 for interpreting a surrounding environment of a vehicle. Device 120 has a forming device 200 and a use device 202.

An image 204, from a central perspective and produced by the image sensor, of a surrounding environment of the vehicle is provided to forming device 200 via a suitable interface, for example at an image sensor of a video camera of a vehicle. Forming device 200 is fashioned to form an item of relational information 206, using a first position of the first object in the image and a second position of the second object in the image, and to provide it to use device 202.

Item of relational information 206, which represents a spatial relation between the first object and the second object in the surrounding environment of the vehicle, is processed in use device 202 in order to interpret the surrounding environment of the vehicle with regard to driver assistance functions that may be required.

According to an exemplary embodiment of device 120, in forming device 200 a further item of relational information 208 is in addition formed, using a further first position of a further first object in the image and a further second position of a further second object in the image, which item of relational information represents a spatial relation between the further first object and the further second object in the surrounding environment of the vehicle. The further item of relational information 208 is also processed in use device 202 to interpret the surrounding environment of the vehicle more thoroughly with regard to driver assistance functions that may be required.

A result of the interpretation of the surrounding environment of the vehicle carried out in use device 202 is provided in a suitably prepared form, via an item of result information 210, for example to a driver assistance system of the vehicle that, using this information, for example controls a lane holding function of the vehicle.

According to an exemplary embodiment of device 120, forming device 200 is in addition fashioned to assign the objects represented in the digital image to one or more object classes. Correspondingly, in use device 202 the surrounding environment of the vehicle is further interpreted using the classification of the objects.

Alternatively or in addition, forming device 200 can in addition be fashioned to form an item of occlusion information 212 in case of an occlusion of an object by another object in the central-perspective image, and to provide this information to use device 202. Correspondingly, in use device 202 the surrounding environment of the vehicle is further interpreted using occlusion information 212.

The number of relations between objects is not limited to for example the relations 206, 208, 212, 214. Arbitrarily many relations of types 206, 208, 212, 214 can exist, as well as further appropriate relations that are not explicitly mentioned here.

Due to the polar measurement design of the optical sensor, according to a further exemplary embodiment it makes sense to determine, in forming device 200, a bearing 214 of at least one object acquired by the sensor and represented in the image, and to provide it to use device 202. This device uses bearing 214 for an interpretation of the surrounding environment of the vehicle, in particular with respect to moving objects that may cross a path of the vehicle, such as pedestrians or bicyclists.

Figure 3:
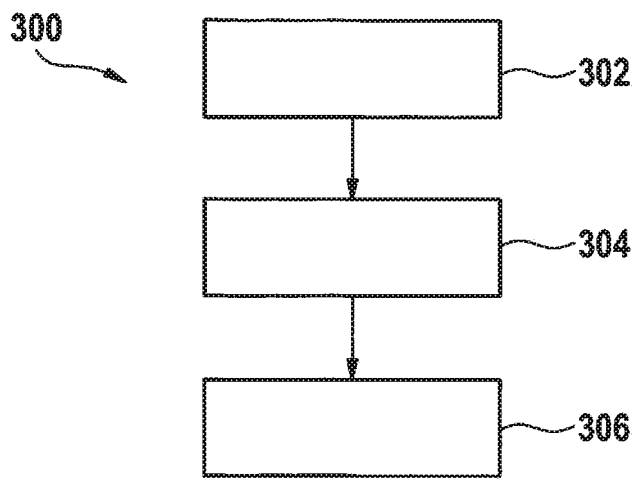
FIG. 3 shows a sequence diagram of a method for interpreting a surrounding environment of a vehicle, according to an exemplary embodiment.

FIG. 3 shows a flow diagram of an exemplary embodiment of a method 300 for interpreting a surrounding environment of a vehicle. Method 300 can be executed by the device shown in FIGS. 1 and 2 for interpreting a surrounding environment of the vehicle.

In a step of provision 302, a central-perspective image of the surrounding environment of the vehicle is provided, produced by an optical sensor of the vehicle oriented in a direction of travel of the vehicle. In a step of forming 304, using positions of objects in the image at least one item of relational information is formed that represents a spatial relation between objects in the surrounding environment of the vehicle. In a step of use 306, the item of relational information is used for example in a driver assistance device or a computing unit of a camera of the vehicle assigned to the optical sensor to interpret the surrounding environment of the vehicle.

For a function of tracking moving objects in the surrounding environment of the vehicle, steps 302, 304, 306 can be executed repeatedly.

If, during the use 306 or interpretation of the formed information 304, further information arises, this can also be used in method 300 as formed information 304.

Figure 4:
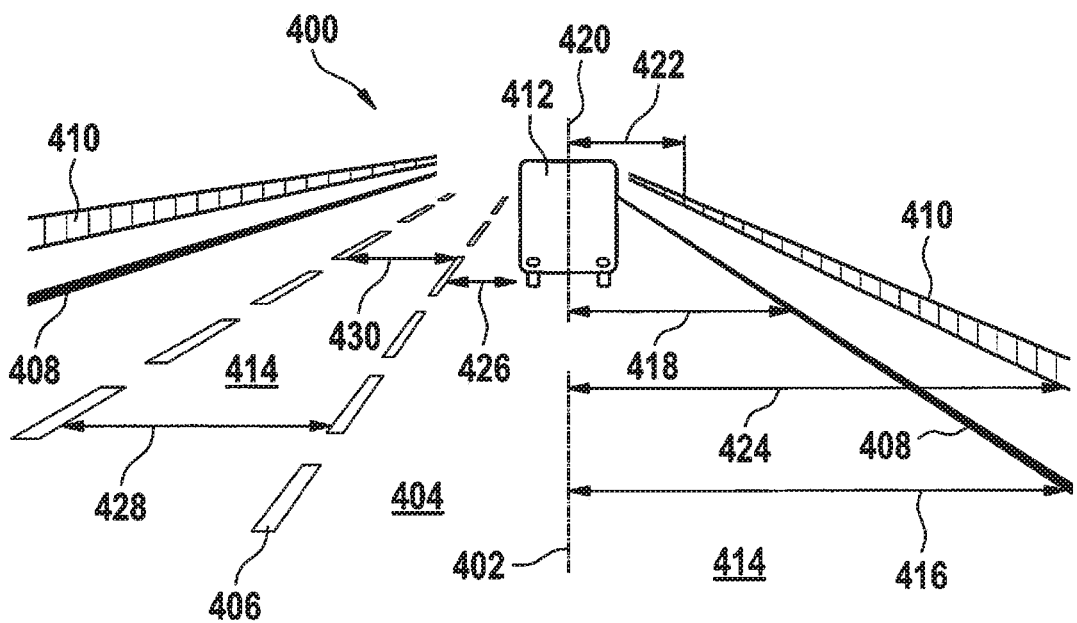
FIG. 4 shows a schematic representation of an image, from a central perspective, of a highway scenario for forming an item of relational information, according to an exemplary embodiment.

For an easily surveyable explanation of the concept presented herein of the relative object descriptions as a basis for driver assistance functions, FIG. 4 schematically shows an example of a central-perspective digital image 400 of a surrounding environment of a vehicle. Shown here is a typical highway scenario, as seen and imaged by an image sensor of a video camera mounted behind the windshield of an exemplary vehicle—the home vehicle. The home vehicle is to be conceived as situated in front of the schematic perspective image 400 shown in FIG. 4, and is represented in FIG. 4 by a line 402 that shows a position of a central longitudinal axis of the home vehicle relative to the driving scene shown in digital image 400.

In the central-perspective image 400 shown in FIG. 4, as an example a highway scene is schematically shown as a driving situation. The scene is made up of an open surface 404, on which lanes are identified by markings 406. Lateral limits of a roadway formed by open surface 404 are bounded by side markings 408. Next to open surface 404, guide rails 410 are erected. In front of the home vehicle, for example a truck 412 is traveling. Truck 412 is traveling in a lane 414 of roadway 404 in which the home vehicle is also traveling. Markings 406, lateral markings 408, guide rails 410, truck 412, and lane 414 form objects in image 400.

A new relative description of the scene shown in digital image 400 is accomplished as follows. From mid-axis 402, representing the home vehicle, a lateral distance 416 is measured to the right lateral roadway boundary 408. In front, truck 412 is traveling with a lateral distance 418 from the right lateral roadway boundary 408. The lateral distance 418 is measured from a further line 420, representing a mid-axis of truck 412, to roadway boundary 408.

According to the design proposed here, in the central-perspective image 400 represented relations between objects 406, 408, 410, 412, 414 are used as the basis of an interpretation of the surrounding environment of the home vehicle. Relations here describe relationships between the objects 406, 408, 410, 412, 414, of image 400, such as a "neighborhood relation." In FIG. 4, this is given by further vehicle 412, which is traveling in front of the home vehicle along guide rail 410. Such relative relationships are similar to the interpretation of the situation made by a human, and offer great potential for understanding a scene or driving situation. Thus, a possible behavior of an assistance function of the home vehicle could be to follow precisely this vehicle 412 and guard rail 410. If for example vehicle traveling in front 412 cannot be well-recognized, then the home vehicle follows guide rail 410.

According to an exemplary embodiment, a device provided in the home vehicle first determines an item of relational information using lateral distance 416, and determines a further item of relational information using lateral distance 418, for the interpretation of the surrounding environment of the vehicle. Using the relational information and the further item of relational information, the device subsequently generates a relation value that supplies an interpretation result of the surrounding environment of the vehicle shown in image 400, which can be used in the driver assistance system of the home vehicle for a function of following travel behind truck 412.

The home vehicle can thus functionally follow vehicle 412 traveling in front by keeping its lateral distance 416 from the same marking 408, without for this purpose having to measure vehicle 412 traveling in front in precise, absolute fashion, e.g. using a Cartesian coordinate system. During travel care need only be taken that the home vehicle for example does not collide with vehicle 412 traveling in front, for example when approaching closer to it. The demands made on a recognition of vehicle 412 traveling in front can thus be advantageously reduced. Instead, it is observed whether the relation value, derived from the distances 416, 418 to the common object 408, remains unchanged.

Object descriptions used according to the approach presented here are more robust than other forms of description, because they follow structures directly visible by a camera, or use direct measurement quantities, such as the size of an object 406, 408, 410, 412, 414, in image 400, or the distances among one another of objects 406, 408, 410, 412, 414. In addition to the increase in robustness, an increase in the range of the video sensor is also achieved.

An alternative reference object for the interpretation of the vehicle surrounding environment can be provided by lateral guard rail 410, having a relative distance 422 from truck 412. The home vehicle also has a corresponding distance 424 from the same guard rail 410. Another advantageous alternative is provided by a lateral distance 426 from truck 412 to marking 406. Further items of relational information between objects 406, 408, 410, 412, 414 can be determined and used as the basis for the interpretation of the environment.

Items of relational information can also be determined within an object 406, 408, 410, 412, 414. Thus, the center lane 414 at close range has a first measured width 428. If it is assumed that the width of the lane in the current scene will not change at a further distance, then a second measured width 430 at a greater distance will be almost identical to the value 428. By using this internal relation, here as well an increase in robustness and range can be achieved. Measurement value 430, for which the camera in the home vehicle has in this way ascertained a metrical value, can also be used to measure further objects in the environment of a position of measurement value 430.

With regard to the example shown in FIG. 4 of the relative description of the traffic situation for the possible scenario of highway travel, the approach presented here shows that for the interpretation of an image content of an image 400 of a surrounding environment of the vehicle, first the perspective of the camera in the home vehicle is maintained, and a closed and complete description of the situation is produced there. A projection to a bird's-eye perspective is thus not carried out at first, in order to obtain a greater amount of information and to avoid gaps and errors resulting from the conversion. Instead, a maximum degree of precision and availability of information is gained directly from the video sensor.

In particular, the polar properties of the measurement design of the video camera are taken into account. Thus, for example the observation of an object 406, 408, 410, 412, 414 at a particular angle—the bearing—is a robust and direct measurement quantity. Here, the precision and resolution of a measurement of the distance and of the object size is greater at close range than it is farther away from the camera, due to the polarity. Size changes can also be directly measured from the appearance of the object, and these can be used to calculate for example a time-to-contact or TTC value. Time-to-contact describes a time after the elapsing of which the home vehicle would collide with a specific observed object.

If objects 406, 408, 410, 412, 414 have been recognized and classified if warranted, then they can be tracked in the surface image signal of the video sensor, in a so-called tracking. Regions having uniform track vectors, i.e. as it were an optical "flow" of an image sequence, provide an additional index for objects situated in the surrounding environment of the vehicle, in particular moving objects, such as truck 412.

In the exemplary image 400 shown in FIG. 4, marking 408 forms a common relative reference object for objects 402 and 412. Via the common relative reference object 408, the linking of the vehicle close range with the far range is achieved.

In the close range in front of the camera, it is often in addition possible to obtain reliable information for measuring the acquired objects 406, 408, 410, 412, 414. These are the basis for a Cartesian description of the scene via the measurement of lateral and frontal (longitudinal) distances, and are a precondition for a bird's-eye perspective or grid representation of the scene. In the close range, a three-dimensional measurement of the scene is carried out. Such measurements can be propagated suitably into the far range of the scene via the relations. These strategies are also used in human vision.

As an example, an optically acquired lane 406 can be taken as an exemplary object, whose width will not vary greatly going from close range to far range. Based on this width, for example it is possible to estimate, or propagate, the width of additional vehicles, such as truck 412, at far range. In the far range, primarily two-dimensional features are evaluated in perspective image 400. The device for interpreting a surrounding environment of a vehicle is fashioned to produce a scene interpretation of the current driving situation from the combination of all available image properties, achieving a high degree of completeness.

Image properties available according to the approach proposed here include for example relative object relations of objects 406, 408, 410, 412, 414, such as neighborhoods and directions of motion, the propagation of object relations in the scene, such as for the example of guardrail 410, further specific object descriptions for close range (3-D) and far range (2-D) of the camera, it being possible to draw or propagate relations between the information from the close range and from the far range of the scene, and the use of direct video sensor or camera sizes relative to neighborhoods, the flat appearance of objects, bearing, TTC, polar property of the video sensor, etc.

Figure 5:
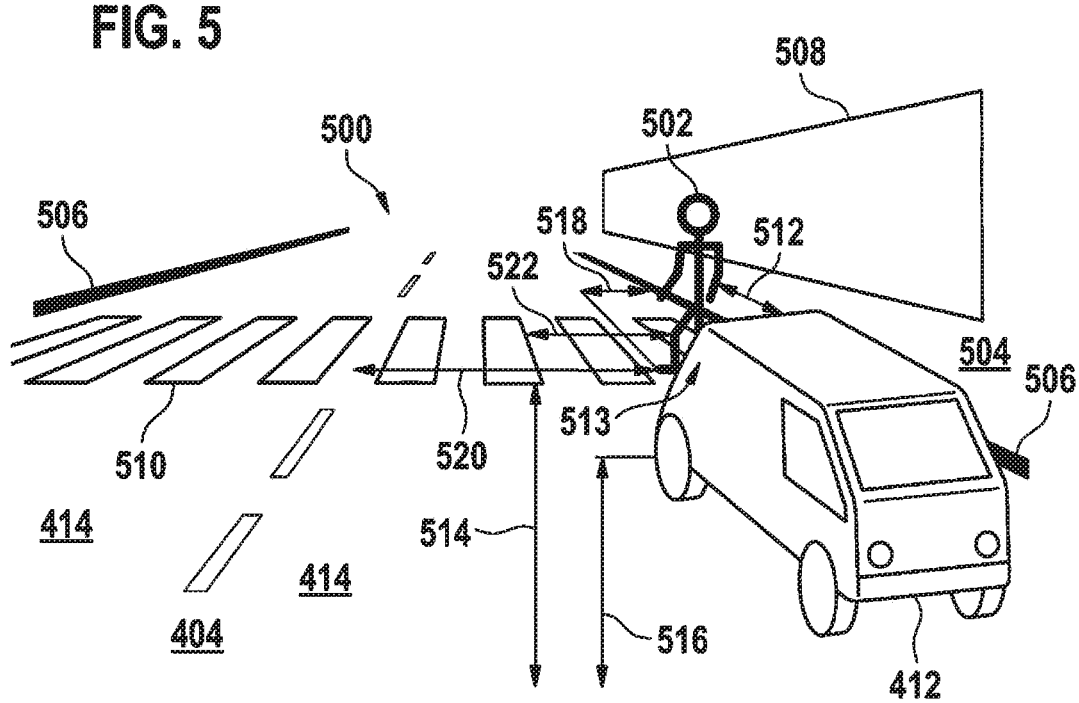
FIG. 5 shows a schematic representation of an image, from a central perspective, of an urban scene for forming an item of relational information, according to an exemplary embodiment.

For the illustration of the design presented herein of the relative object descriptions as a basis for driver assistance functions, FIG. 5 schematically shows an exemplary central-perspective digital image 500 of a surrounding environment of the vehicle in a typical urban environment. Shown here is a possible urban scenario as seen and imaged by an image sensor of a video camera mounted behind the windshield of an exemplary home vehicle. Here as well, the home vehicle is to be understood as being in front of the schematic perspective image 500 shown in FIG. 5.

In the example shown in FIG. 5 of the relative description of the traffic scene on the basis of a further exemplary embodiment of a central-perspective image 500 of a surrounding environment of a vehicle, a person 502 steps off a pedestrian path 504 onto lane 414 situated in roadway 404. Between lane 414 and pedestrian path 504, there is a curb 506. To the right of pedestrian path 504, there is a building 508. The person, i.e. pedestrian, 502 steps onto the street behind a parked further vehicle 412, stepping onto a pedestrian crosswalk, or zebra stripes 510.

In the urban scenario shown in FIG. 5 as well, for the interpretation of the surrounding environment of the vehicle, the surface acquisition of the situations by the image sensor or camera an image of the video camera installed in the home vehicle is exploited as completely as possible in the image acquisition. The device provided in the home vehicle for interpreting the surrounding environment of the vehicle places a position of pedestrian 502 in digital image 500 in relation to a position of vehicle 412 in order to form an item of relational information using a distance 512 between pedestrian 502 and vehicle 412.

The item of relational information here describes a neighborhood relation between objects 502, 412. In addition, here the device determines an item of occlusion information that represents a partial occlusion 513 of pedestrian 502 by vehicle 412. From these relations, for example geometrical boundary conditions of the scene in image 500 can be derived. In this way, it can be ascertained that a longitudinal position 514 of person 502, or the distance in front of the home vehicle, is situated behind a longitudinal position 516 of an end of vehicle 412. An evaluation of the relation that describes object occlusion 513 here supports the metrical interpretation of the scene. A function based thereon can in this way have better performance, e.g. a higher recognition rate with lower misrecognition rate.

A further item of relational information in digital image 500 is determined by a distance 518 of person 502 from curb 506. A complementary item of content is described by a further item of relational information that is based on a distance 520 of person 502 from the center of the roadway. According to exemplary embodiments, these items of relational information can support each other mutually, and/or can reduce errors in measurements. In addition, the measurement of distance 518 can be supported using the occlusion information.

In digital image 500, person 502 is moving over pedestrian crossing or zebra stripes 510. Accordingly, there is a local assignment relation 522, here concretely a "situated at" relation 522, between pedestrian 502 and object 510. The device can also determine an item of relational information using "situated at" relation 522. This can be used in multiple ways for the interpretation of the surrounding environment of the vehicle. On the one hand, a classification of pedestrian crossing 510 can support an object hypothesis of person 502, and vice versa. On the other hand, from the combination of object 502, classified as a pedestrian, and object 510, classified as a pedestrian crossing, a (probable) intention of pedestrian 502 to cross roadway 414 via pedestrian crossing 510 can be derived. Likewise, the item of occlusion information based on occlusion relation 513 can be used in the environmental interpretation, etc.

The described neighborhood relations thus at first facilitate the process of interpretation in the video sensor, and subsequently supply to the external interfaces of the camera important information for driving functions based on the relative information. Locally connected regions in image 500, such as pedestrian path 504, can also be used to interpret significance. In particular, the interpretation can be propagated from the close range of the video sensor into the far range.

In addition to the described relations, which can be ascertained at a time or in an image of an image sequence in the scene, the dynamics of object movements can be used for the description using relations.

Figure 6:
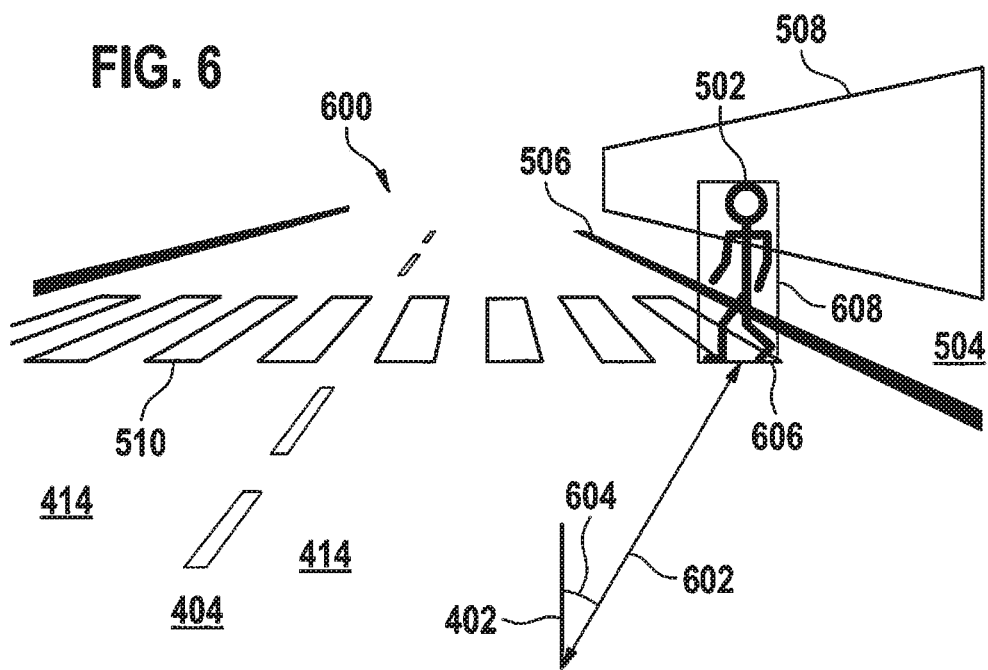
FIG. 6 shows a schematic representation of a further image from a central perspective of an urban scene for forming an item of relational information according to an exemplary embodiment.

FIG. 6 schematically shows a further exemplary central-perspective digital image 600 of a vehicle surrounding environment in a typical urban environment, produced by a video camera of a vehicle moving in the surrounding environment of the vehicle. Shown here is essentially the urban scenario of FIG. 5, without the parked vehicle.

The representation in FIG. 6 illustrates the polar measurement of an object—here, pedestrian 502—enabled by the design presented here, using polar coordinates of pedestrian 502 in image 600.

For this purpose, the device for interpreting the surrounding environment of the vehicle uses direct measurement quantities ascertained by the video sensor. Thus, a polar distance 602 describes a distance between the home vehicle and person 502. This is measured in a suitable angular measure at a polar angle 602 with center line 402 of the home vehicle. Based on these distance and angular values, the device determines a bearing of pedestrian 502 relative to the optical sensor in the vehicle, and uses this bearing for the interpretation of the surrounding environment of the vehicle.

According to an exemplary embodiment, the device for interpreting the environment also uses an extension 606 of person 502 in the lateral and/or longitudinal direction, as well as an object height 608 of person 502. Such local extensions 606, 608 in digital image 600 are measured in image pixels and/or metrical quantities and/or angular measures.

In a tracking function of the design presented here, the tracking of objects such as pedestrian 502 can be used to measure changes in bearing or changes in object size 608 or object extension 606. Changing bearings indicate that the home vehicle will not collide with object 502, while a temporally unchanged bearing indicates a probable collision with object 502.

Changing bearings between objects can also be used to ascertain the relative distance or depth estimation of an object. The depth estimation can be used as a further support for the interpretation of the scene. Here, the parallax of the various objects can be taken into account.

The techniques presented on the basis of FIGS. 1 through 6 for interpreting the surrounding environment of the vehicle offer the possibility of a bottom-up analysis of a scene presented in central-perspective digital image 204, 400, 500, 600. In order to determine suitable items of relational information for the realization of the design presented here, in particular distance relations, neighborhood relations, relations between common reference objects, occlusion relations, local assignment relations (e.g. "situated on," "situated under"), complementary relations, and propagating relations (e.g. between close range and far range of the scene in digital image 400, 500, 600) are used for this purpose. Other relations are also conceivable.

The relations are each moderated directly in image 204, 400, 500, 600, and/or relate to other suitable coordinate systems. In addition there are movement relations that describe relative changes to and/or between objects of the scene. Exemplary movement relations are a change of bearing, in contrast to a constant bearing, a change in size, a relative change in bearing between objects (parallax), and the tracking of relation changes; for example, neighborhood relations can change and from this an object behavior can be derived. Examples of this are a vehicle traveling in front that moves further away or comes closer, vehicles that are passing or are being passed, vehicles that are approaching and that occlude other traffic participants.

The analysis design can, in addition to the bottom-up approach, advantageously be supplemented, through the relations, by a top-down analysis. From the contexts and/or relations, more abstract information can be derived relating to a scene. For example, objects situated close to one another in the digital image 204, 400, 500, 600, often stand in the same context to other objects in the scene. In addition, a degree of completeness of the interpretation of the scene can be achieved by finding and treatment of "holes" in the description and/or the scene interpretation. In addition, a completion of a scene interpretation along with reduction of regions of the scene that are not interpreted is conceivable. According to an exemplary embodiment, movement patterns of the same type of objects—for example vehicles in a group, groups of pedestrians, etc.—can be recognized and taken into account. A behavior of objects can be recognized, or relations that connect objects can be recognized, and/or possible views of the objects can be determined therefrom. A pattern of behavior, or recognition of intention, can be used to improve the range of recognition and/or availability of object information.

According to a further exemplary embodiment, the recognition of a coarse structure of the scene is also conceivable. Here, for example findings about a main direction of a street and/or of a course of the street, and a distance to the vanishing point are obtained. The (essential) limitations of the travelable street surface are identified, and laterally structuring elements are determined, such as guide rails, guideposts, an avenue of trees, etc.

The sequence of an exemplary scene interpretation can be divided into two phases, advantageously supported by relations. In a first phase, there takes place a bottom-up analysis of a scene, for example data-driven from sensor information. In a second phase, a top-down analysis of the scene is carried out, driven by content and meaning from the view of the scene.

The design presented herein of relative object description as a new type of video sensor interface for driver assistance systems is suitable for the realization of high-performance automatic and/or (partly) automated driving functions. The scenarios that can be improved using the proposed methods thus play an important role in the roadmap towards automatic driving. Against the background of the high availability, present in this context, of for example the longitudinal and transverse guiding of vehicles, use of the approach proposed here is advantageous.

If an exemplary embodiment contains an "and/or" connection between a first feature and a second feature, this is to be read as meaning that according to a first specific embodiment the exemplary embodiment includes both the first feature and the second feature, and according to a further specific embodiment the exemplary embodiment includes either only the first feature or only the second feature.

What is claimed is:

1. A method for interpreting a surrounding environment of a vehicle, comprising:
providing a video image of the surrounding environment of the vehicle;
forming an item of relational information, using a first position of a first object, in the video image, and a second position of a second object in the video image, wherein the item of relational information represents a spatial relation between the first object and the second object in the surrounding environment of the vehicle; and
using the item of relational information to interpret the surrounding environment;
wherein the video image includes a central-perspective image of a driving scene.

2. The method as recited in claim 1, wherein, in the using, the item of relational information is used for at least one of a lateral steering function and a longitudinal regulation of the vehicle.

3. The method as recited in claim 1, further comprising:
assigning at least one of the first object and the second object to an object class that is used, in the using, to interpret the surrounding environment of the vehicle.

4. The method as recited in claim 1, further comprising:
forming an item of occlusion information that represents an occlusion of the first object by the second object in the video image; and
using the item of occlusion information in the using the item of relational information to interpret the surrounding environment of the vehicle.

5. The method as recited in claim 1, wherein:
in the forming, an additional item of relational information is formed using a further first position of a further first object in the video image and a further second position of a further second object in the video image, the further item of relational information representing a spatial relation between the further first object and the further second object in the surrounding environment of the vehicle, and
in the using, the further item of relational information is used to interpret the surrounding environment of the vehicle.

6. The method as recited in claim 5, wherein the using includes generating a relation value between the item of relational information and the further item of relational information, to interpret the surrounding environment of the vehicle using the relation value.

7. The method as recited in claim 6, wherein, in the using, the relation value is used for following travel behind a further vehicle.

8. The method as recited in claim 1, further comprising:
determining a bearing of one of the objects or of a further object in relation to an optical sensor, wherein the bearing is used, in the using, to interpret the surrounding environment of the vehicle.

9. A device for interpreting a surrounding environment of a vehicle, comprising:
an arrangement configured to perform the following:
a video image of the surrounding environment of the vehicle;
forming an item of relational information, using a first position of a first object, in the video image, and a second position of a second object in the video image, wherein the item of relational information represents a spatial relation between the first object and the second object in the surrounding environment of the vehicle; and
using the item of relational information to interpret the surrounding environment;
wherein the video image includes a central-perspective image of a driving scene.

10. A vehicle, comprising:
an optical sensor, which includes a video camera;
a driver assistance system; and
a device connected electrically and conductively to at least one of the optical sensor and the driver assistance system, the device being for interpreting a surrounding environment of a vehicle, and configured for performing the following:
providing a video image of the surrounding environment of the vehicle;
forming an item of relational information, using a first position of a first object, in the video image, and a second position of a second object in the video image, wherein the item of relational information represents a spatial relation between the first object and the second object in the surrounding environment of the vehicle; and
using the item of relational information to interpret the surrounding environment;
wherein the video image includes a central-perspective image of a driving scene.

11. A non-transitory computer readable medium having a computer program, which is executable by a processor, comprising:
a program code arrangement having program code for interpreting a surrounding environment of a vehicle, by performing the following:
providing a video image of the surrounding environment of the vehicle;
forming an item of relational information, using a first position of a first object, in the video image, and a second position of a second object in the video image, wherein the item of relational information represents a spatial relation between the first object and the second object in the surrounding environment of the vehicle; and
using the item of relational information to interpret the surrounding environment;
wherein the video image includes a central-perspective image of a driving scene.

12. The non-transitory computer readable medium of claim 11, wherein in the forming, an additional item of relational information is formed using a further first position of a further first object in the video image and a further second position of a further second object in the video image, the further item of relational information representing a spatial relation between the further first object and the further second object in the surrounding environment of the vehicle, and wherein in the using, the further item of relational information is used to interpret the surrounding environment of the vehicle.

* * * * *